(12) United States Patent
Hainline

(10) Patent No.: US 9,462,337 B2
(45) Date of Patent: *Oct. 4, 2016

(54) PEER-TO-PEER VIDEO ON DEMAND TECHNIQUES

(71) Applicant: AT&T Intellectual Property I, LP, Atlanta, GA (US)

(72) Inventor: William Hainline, Rockwell, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/196,539

(22) Filed: Mar. 4, 2014

(65) Prior Publication Data

US 2014/0189762 A1 Jul. 3, 2014

Related U.S. Application Data

(63) Continuation of application No. 11/399,582, filed on Apr. 5, 2006.

(51) Int. Cl.
*H04N 7/173* (2011.01)
*H04N 7/167* (2011.01)
(Continued)

(52) U.S. Cl.
CPC .... *H04N 21/44245* (2013.01); *H04N 7/17318* (2013.01); *H04N 21/2393* (2013.01);
(Continued)

(58) Field of Classification Search
USPC .................................................. 725/86–100
See application file for complete search history.

(56) References Cited

U.S. PATENT DOCUMENTS 5,956,716 A 9/1999 Kenner et al.
7,403,939 B1 * 7/2008 Virdy ............................ 707/718
(Continued)

FOREIGN PATENT DOCUMENTS

GB 2412279 9/2005
JP 11-127427 11/1999
(Continued)

OTHER PUBLICATIONS

Do, T. et al., "P2VoD: providing fault tolerant video-on-demand streaming in peer-to-peer environment", IEEE International Conference; vol. 3, ISBN: 978-0-7803-8533-7, Jun. 2004, 1467-1472.
(Continued)

*Primary Examiner* — Gigi L Dubasky
(74) *Attorney, Agent, or Firm* — Guntin & Gust, PLC; Ralph Trementozzi

(57) ABSTRACT

Techniques for delivering video-on-demand content via peer-to-peer connections are provided. A video-on-demand distribution service maintains associations of viewer devices that have specific video-on-demand content. As new viewer devices, which lack the specific video-on-demand content, make requests for the specific video-on-demand content from the video-on-demand distribution system, the video-on-demand distribution system identifies a peer-to-peer viewer device from which the specific video-on-demand content may be acquired via a peer-to-peer transaction. Video-on-demand content sources are identified by comparing distances between the geographical location of the requestor device and geographical locations of devices of the plurality of viewer devices to a distance threshold. A first portion of a first item of video on demand content is obtained from source viewer device and a second portion of the first item of video on demand content is obtained from the video distribution system. Other embodiments are disclosed.

20 Claims, 6 Drawing Sheets

(51) Int. Cl.
 *H04N 7/16* (2011.01)
 *H04N 21/442* (2011.01)
 *H04N 21/231* (2011.01)
 *H04N 21/239* (2011.01)
 *H04N 21/433* (2011.01)
 *H04N 21/472* (2011.01)
 *H04N 21/4788* (2011.01)
 *H04N 21/63* (2011.01)

(52) U.S. Cl.
 CPC .... *H04N21/23113* (2013.01); *H04N 21/4331* (2013.01); *H04N 21/4334* (2013.01); *H04N 21/4788* (2013.01); *H04N 21/47202* (2013.01); *H04N 21/632* (2013.01)

(56) References Cited

U.S. PATENT DOCUMENTS

| | | | |
|---|---|---|---|
| 7,574,488 | B2 | 8/2009 | Matsubara |
| 8,707,375 | B2 * | 4/2014 | Hainline ................. 725/87 |
| 2002/0053082 | A1 | 5/2002 | Weaver, III et al. |
| 2002/0068592 | A1 | 6/2002 | Hutcheson et al. |
| 2003/0005056 | A1 | 1/2003 | Yamamoto et al. |
| 2003/0130979 | A1 | 7/2003 | Matz et al. |
| 2003/0158958 | A1 | 8/2003 | Chiu |
| 2003/0204856 | A1 | 10/2003 | Buxton |
| 2004/0117845 | A1 * | 6/2004 | Karaoguz et al. ............ 725/134 |
| 2004/0139024 | A1 | 7/2004 | So |
| 2005/0268102 | A1 * | 12/2005 | Downey ................. 713/176 |
| 2006/0107286 | A1 | 5/2006 | Connor et al. |
| 2006/0123455 | A1 | 6/2006 | Pai et al. |
| 2007/0056002 | A1 | 3/2007 | Ganesan et al. |
| 2007/0079342 | A1 | 4/2007 | Ellis et al. |
| 2007/0094142 | A1 | 4/2007 | Russell et al. |
| 2009/0106393 | A1 * | 4/2009 | Parr et al. .................... 709/218 |

FOREIGN PATENT DOCUMENTS

| | | |
|---|---|---|
| JP | 2003-203084 | 7/2003 |
| JP | 2003-289521 | 10/2003 |
| JP | 2003-256597 | 12/2003 |
| JP | 2004-0005491 | 1/2004 |
| JP | 2004-172818 | 6/2004 |
| WO | 98/31114 | 7/1998 |
| WO | 2005/078623 | 8/2005 |

OTHER PUBLICATIONS

R. Tagami, "Notification of Reason for Refusal—First Office Action", dispatched Oct. 31, 2011, 6 pages.

* cited by examiner

PEER-TO-PEER VIDEO ON DEMAND TECHNIQUES

CROSS-REFERENCE TO RELATED APPLICATIONS

This application is a continuation of and claims priority to U.S. patent application Ser. No. 11/399,582 filed Apr. 5, 2006, which is incorporated herein by reference in its entirety.

FIELD OF THE DISCLOSURE

This application relates to media processing, and more specifically to techniques for distributing video on demand (VOD) content via P2P techniques.

BACKGROUND OF THE DISCLOSURE

Video on demand (VOD) continues to proliferate. Consumers are adjusting to the capability of receiving content on demand without specifically acquiring a physical product from a store or from a mail-order service. Typically, the acquired physical media is then played on a device at the leisure of the consumers. But, consumers are rapidly learning that videos of movies can be dynamically delivered to their viewing environments without the need to acquire a recording medium (e.g., Digital Versatile Disk (DVD), etc.) and subsequently manually interfacing the recording medium to a media player (e.g., DVD player, etc.). Thus, when a consumer desires to view a movie or video the consumer can interface with services within their own viewing environments using remote control devices and dynamically acquire and play the desired media over a network. This technology poses significantly challenges to the video rental markets and their existing business models.

One challenge for VOD technology is that a particular piece of content may be overwhelmingly popular or may be desired at roughly the same time and same day by a variety of concurrently requesting viewers. When this occurs, the distributor of the content is likely to experience significant bandwidth challenges and the viewers are likely to experience unacceptable or undesirable delays in acquiring their desired content. This is a frequent challenge with VOD delivery services because a centralized distribution point can quickly become overloaded with requests for popular or newly released content.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION OF THE DRAWINGS

In the following description, for purposes of explanation, numerous specific details are set forth in order to provide a thorough understanding of an embodiment of the present disclosure. It will be evident, however, to one skilled in the art that the present disclosure may be practiced without these specific details.

Figure 1:
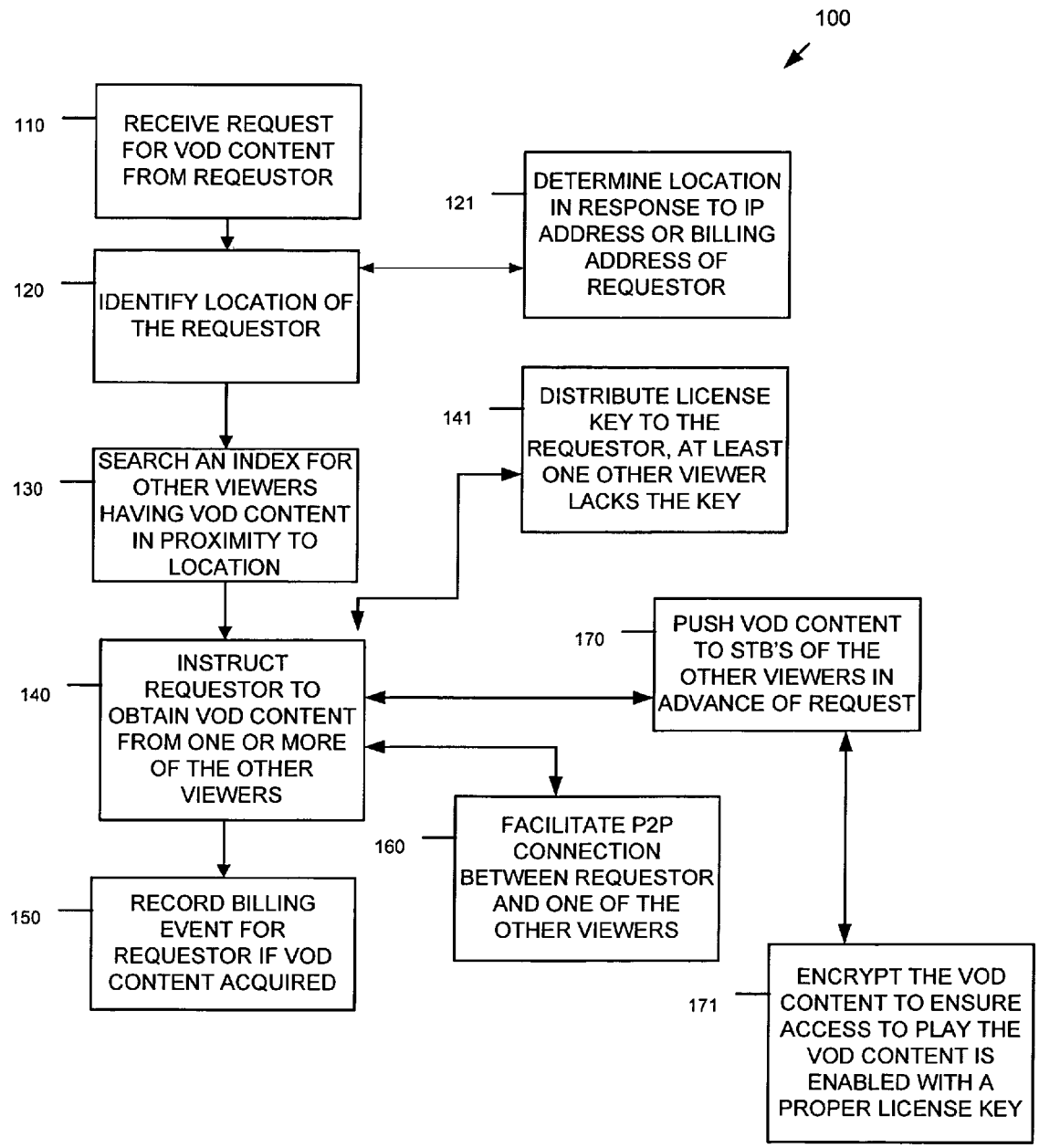
FIG. 1 is a diagram of method to distribute video on demand (VOD) content, according to an example embodiment of the disclosure.

FIG. 1 is a diagram of method 100 for distributing video on demand (VOD) content, according to an example embodiment of the disclosure. The method 100 (hereinafter VOD distribution service) is implemented in a machine-accessible and readable medium and is accessible over a network. The network may be wired, wireless, or a combination of wired and wireless.

In an embodiment, the VOD distribution service is implemented over a network as a server for a cable or satellite television provider or as a server for a content provider, such as Home Box Office (HBO), Showtime, and the like. The VOD distribution service interacts with viewers via remote control devices of the viewers, when the viewers select VOD content for consumption on their set-top boxes (STB's) and subsequent viewing on their televisions. Some aspects or features of the VOD distribution service do not directly interact with the viewers; rather other services on the viewers STB's interact with the VOD distribution service and with other viewer STB's in the background and unbeknownst to the viewers. These interacts are described more completely herein and below as processing associated with the VOD distribution service. The processing of any particular STB for these interactions is discussed with FIG. 3 below.

With this context, the processing of the VOD distribution service is now discussed with reference to the FIG. 1. Accordingly, at 110, the VOD distribution service receives a request for VOD content from a requestor. That is, a requester of viewer uses a remote control device or other input device to communicate over the network with the VOD distribution service that a specific piece of VOD content is desired by the viewer (requester).

In connection with the request, at 120, the VOD distribution service identifies a geographical location associated with the requestor. According to an embodiment, at 121, the geographical location may be determined in response to an Internet Protocol (IP) address of the requestor or in response to a billing address or device profile associated with an account and account information of the requestor. The geographical location permits the VOD distribution service to intelligently determine how the specific VOD content requested may be optimally delivered to the requester.

At 130, the VOD distribution service uses the request for the VOD content and the geographical location of the requester, to search an index for other viewers that already have the VOD content and that are in proximity to the geographical location of the requester. The proximity consideration may be based on a threshold value. For example, a specific viewer having the VOD content may be considered in proximity to the requester if the geographical location of the requestor is within 500 miles of the specific viewer, within the same region (Midwest, southeast, northwest, etc.), within the same state, within the same country, etc. Thus proximity is resolved based on configured or desired threshold values.

The index includes associations between VOD content and geographical locations of STB's for viewers that have the VOD content. The VOD distribution service uses a request for VOD content and a geographical location of the requestor to search the index and find matches of one or more other viewers that can service or supply the desired VOD content to the requestor over a peer-to-peer (P2P) connection between a servicing STB of a viewer to a STB of the requestor.

At 140, the VOD distribution service instructs or informs the requestor that the desired VOD content may be acquired from one or more of the other viewers that conform to the search criteria used by the VOD distribution service when searching the index. So, the VOD distribution service does not have to identify a single viewer that can service the request for the VOD content; rather, the VOD distribution service may also identify a list (perhaps even a prioritized list) of viewers that may service the request.

According to an embodiment, at 141, the VOD distribution service may also distribute a license key to the requestor. The license key is used to decrypt and play the VOD content. It may be provided if the requestor pays for the VOD content. In some cases, the viewers that are used to service the VOD content directly to the requestor may not possess the license key to play the desired VOD content. So, STB's of viewers may be used as distribution points unbeknownst to the viewers and in a manner that the viewers may not even possess the license key to view the VOD content that their STB's have and are distributing.

In an embodiment, at 150, the VOD distribution service may also record billing events for the requester if the VOD is actually acquired and downloaded to a STB of the requestor. In other words, if a requestor contacts a servicing viewer's STB for the desired content after being instructed to do so by the VOD distribution service, and does in fact receive the desired VOD content, then the servicing viewer's STB may send an event notification to the VOD distribution service. The VOD distribution service uses the event to record a billing entry for the requestor. So, the requestor may be billed when the requestor actually receives the VOD content for viewing and not just when the VOD content is requested.

At 160, the VOD distribution service facilitates the P2P connection between the requester and one of the other viewers identified by the VOD distribution service. In other words, each of the viewers and the requestor (who is also a viewer desiring specific VOD content) have STB's that include P2P communication services and the VOD distribution service identifies a specific viewer for which the P2P communication service of the requestor may use to contact the specific P2P communication service of that specific viewer. The two P2P services then engage in a P2P connection of dialogue where the requestor receives the desired VOD content.

In some cases, at least some of the viewers initially acquire the VOD content for distribution from the VOD distribution service. That is, at 170, the VOD distribution service pushes the VOD content to one or more of the viewers in advance of any request being made for that VOD content by the requestor. The extent of this activity may be driven by policy. So, the VOD distribution service may identity a newly released movie as a potential popular piece of VOD content and may actually pre-seed the network by selecting specific viewers and their STB's to receive the movie. Then, when the announcement is made that the movie is available, requesters and even some of the seed viewers may acquire the movie from one another or in some cases from their selves. This alleviates and heads off any potential bandwidth challenges that may have ensued if prophylactic seeding and P2P techniques were not used.

In some cases, at 171, the initially seeded content may be encrypted to access or play of the VOD content is not achieved by any of viewers used for the seeding. Decryption is possible with license keys that may still be centrally distributed by the VOD distribution service with little concern of bandwidth challenges, since the key will be of significantly less data size then the VOD content.

In some embodiments, the VOD content does not have to be content exclusively delivered and sold by the VOD distribution service. That is, viewers may create their own communities and provide access to their own home videos or pictures to selective other viewers. The access and security related to this sharing may be managed by the VOD distribution service. So, one viewer may be granted access to personalized video and/or pictures of another viewer and the VOD distribution service may facilitate the communication between the two, and then the two may engage in P2P communications to share content. This may be expanded such that an entire home network of one viewer may be shared and exposed in a P2P fashion with another viewer or group of viewers.

Figure 2:
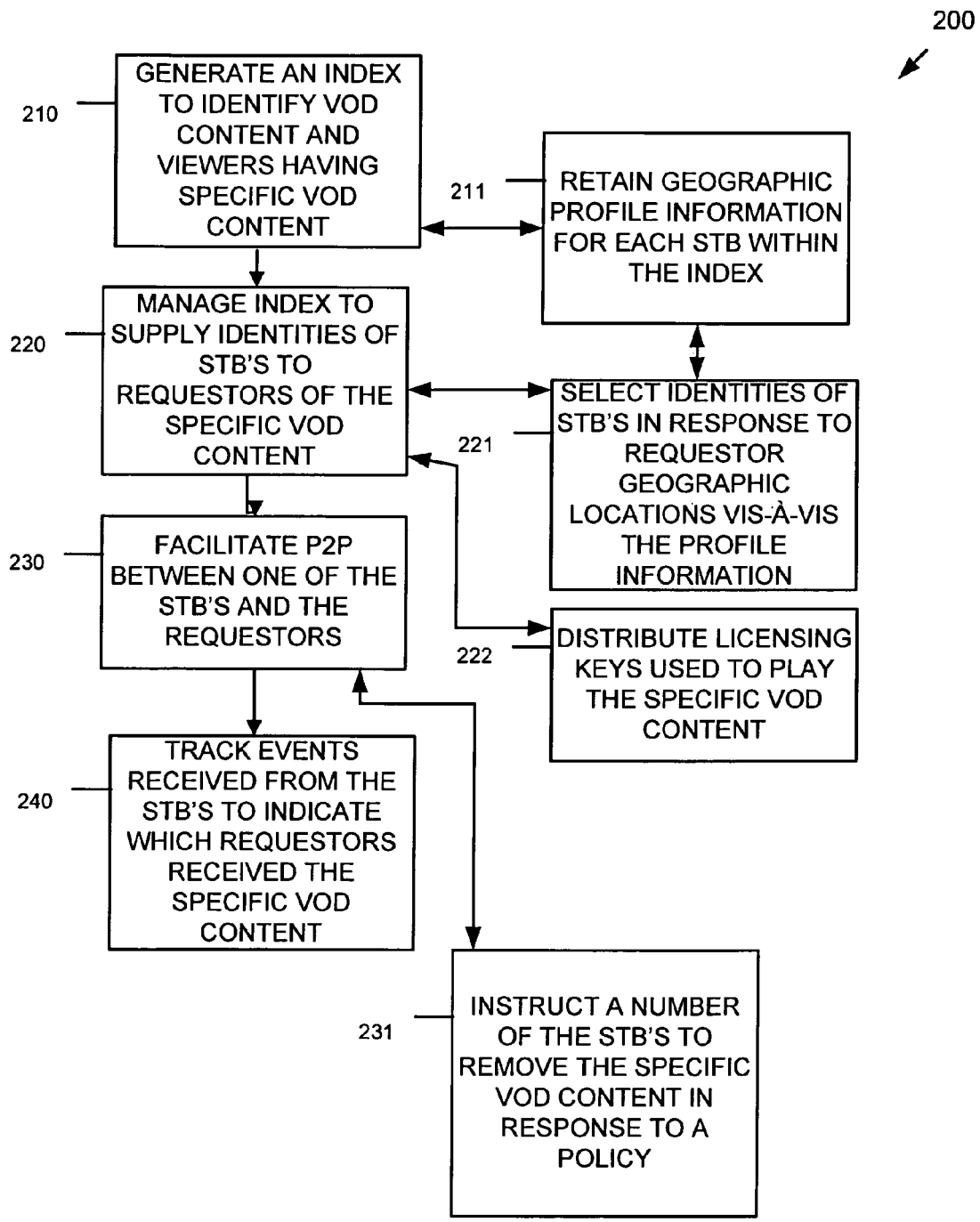
FIG. 2 is a diagram of another method to distribute VOD content, according to an example embodiment of the disclosure.

FIG. 2 is a diagram of another method 200 to distribute VOD content, according to an example embodiment of the disclosure. The method 200 (hereinafter referred to as "content delivery service") is implemented in a machine-accessible and readable medium and is operational over a network. The network may be wired, wireless, or a combination of wired and wireless. In an embodiment, the content delivery service presents an alternative to the processing of the VOD content delivery service represented by the method 100 of the FIG. 1.

The processing of the VOD distribution service represented by the method 100 of the FIG. 1 largely presented a single transaction that may occur between a requesting viewer with the VOD distribution service and the resulting P2P communication or facilitation, where the requesting viewer obtains desired VOD content from another viewer in a P2P transaction with that other viewer. The content delivery service is also capable of this processing but is presented from a more global management position, where the content delivery service generates and manages P2P indexes and services a plurality of requests for VOD content.

Accordingly, at 210, the content delivery service initially generates an index to identify VOD content and viewers having specific VOD content. The index initially may include identifiers for viewers and their STB's. Other profile information may also identify a geographical location for each of the STB's. Thus, at 211, the content delivery service retains geographical profile information for each STB within the index.

After the index is generated, it is regularly updated in a dynamic and real time fashion. Updates reflect when new STB's and viewers are added, deleted, or geographically moved. Updates also occur when viewers are added or deleted. Frequent updates occur to associated VOD content as being available on specific STB's as the VOD content is distributed to the viewers.

At 220, the content delivery service manages the index to supply identities of STB's to requesters of specific VOD content. The identity may be an IP address that a requestor can use to establish a P2P connection with a particular STB for purposes of acquiring desired VOD content. According to an embodiment, at 221, the identities of the STB's may be resolved by comparing the geographical locations of STB's associated with the requesters to the geographical profile information associated with the STB's in the index. This may be done using thresholds to resolve an optimal proximity between requesters and available STB's that have the desired VOD content that the requestors seek. Examples of this were discussed above with the VOD distribution service represented by the method 100 of the FIG. 1.

In an embodiment, at 222, the content delivery service may also distribute licensing keys used to decrypt and play the specific VOD content being requested. So, some STB that house and distribute VOD content may not possess the proper licensing key, such that the viewer associated with that STB can view the VOD content. Stated another way, viewers and their STB's may be used as P2P distributors unbeknownst to the viewers and even if know to the viewers, those viewers could not view the VOD content without first acquiring a proper licensing or decryption key from the content delivery service.

It is noted that the content delivery service may pre-seed or populate the network with VOD content even before any specific request is made for that VOD content. Examples of this were discussed above with the method 100 of the FIG. 1. It is also noted that the content delivery service may in some cases elect to distribute requested VOD content directly to a requestor. This may be done when the bandwidth draw permits or policy permits. So, the content delivery service may itself distribute some of the VOD content in response to a request. In other cases, the content delivery service pre-seeds or populates the network by pushing the VOD content to specific STB's in advance of any announced release of the VOD content or any specific request for that VOD content. In yet more situations, the content delivery service identifies a STB for a requestor to directly acquire desired VOD content via a P2P connection or communication session.

At 230, the content delivery service facilitates P2P communication between one of the STB's identified from the index and the requesters. That is, each STB of the network includes P2P communication services, and the content delivery service provides a key or IP address that permits a requesting STB to directly connect with the P2P communication services of a target or servicing STB, which has the desired VOD content. The content delivery service facilitates and provides the information that permits the P2P connection to occur.

According to an embodiment, at 231, the content delivery service may also instruct a number of the STB's to remove specific VOD content in response to policy evaluations. That is, the content delivery service may manage the lifecycle of the VOD content as it exists on the STB's and may instruct the STB's to remove the VOD content when it is appropriate to do so. This prevents VOD content from lingering too long in any particular location.

In a similar manner, the content delivery service may in some cases crawl the network to acquire information about STB's and the VOD content that they have stored as well as space utilization and available of each of the STB's. This information may be consumed by the content delivery service to perform other management operations and used for deciding which STB to use for distributing VOD content.

At 240, the content delivery service tracks events received fro the STB's to indicate which of the requestors have received their specific VOD content. So, STB's that deliver VOD content to other requesting STB's may report this information as events to the content delivery service. The received events may trigger a variety of automatic processing by the content delivery service, such as but not limited to, billing records, usage profiling, etc.

Figure 3:
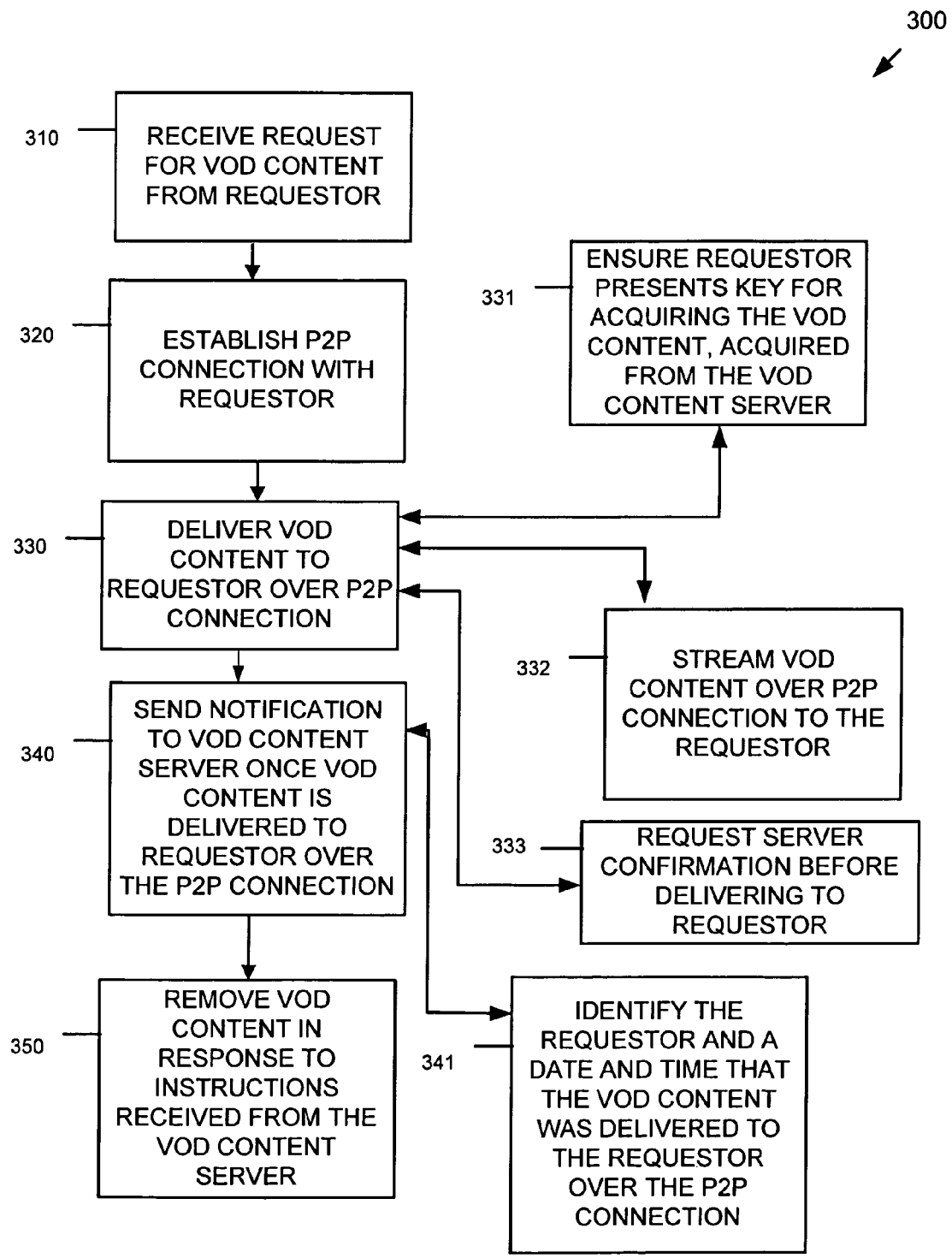
FIG. 3 is a diagram of a method for peer-to-peer (P2P) delivery of VOD content, according to an example embodiment of the disclosure.

FIG. 3 is a diagram of a method 300 for peer-to-peer (P2P) delivery of VOD content, according to an example embodiment of the disclosure. The method 300 is implemented as instructions within in a machine-accessible and readable medium and is operational over a network. The network may be wired, wireless, or a combination of wired and wireless. The instructions when loaded or uploaded to a machine perform the processing depicted in FIG. 3. The processing of the instructions reflect interactions of a set-top box (STB) or other subscriber or viewer devices that receive VOD content from a VOD content distribution services, such as the methods 100 and 200 of the FIGS. 1 and 2), and that directly supply the VOD content to other STB's or requesters in a P2P connection or communication session.

The instructions may be implemented on a removable medium and subsequently interfaced to a machine where the instructions are uploaded within the machine and processed. Alternatively, the instructions may be prefabricated within memory or storage of the machine and loaded for execution when the machine is initiated or booted. In still another arrangement, the instructions may be downloaded from a network storage location or other network machine to a target machine on the network and processed. In yet another situation, the instructions may be remotely processed over a network on one machine at the instruction and on behalf of another different network machine.

Any STB that participates in the network may process the instructions. Thus, the instructions interact with the VOD distribution service and the content delivery service represented by the methods 100 and 200 of the FIGS. 1 and 2, and the instructions interact with other instances of the instructions processing on other STB's over the network. The instructions are enabled to communicate with other STB's via a P2P connection or communication channel over the network.

At 310, the instructions receive a request for VOD content from a requestor. The requestor is another STB that may be processing another instance of the instructions. Thus, the instructions are designed to process in duplicate over the network and to communicate with different instances of itself. Prior to receiving the request, the instructions acquired the VOD content from a VOD server or service, such as the ones described above with respect to the methods 100 and 200 of the FIGS. 1 and 2.

At 320, the instructions establish a P2P connection with the requester. That is, the instructions directly connect over the network to the requestor. At 330, the instructions deliver the VOD content to the requester over the P2P connection.

In some cases, at 331, the instructions ensure that the requestor presents an access key before the VOD content is delivered from the environment of the instructions to the requestor. The access key is acquired by the requestor from the VOD content server or service, such as the services represented by the methods 100 and 200 of the FIGS. 1 and 2. In this manner, the instructions may require some form of access authentication before the VOD content is provided over the P2P connection to the requestor.

According to an embodiment, at 332, the instructions may also stream the VOD content over the P2P connection to the requester. That is, streaming protocols may be used to stream the VOD content to the requester. So, the requestor may buffer and play the VOD content on display devices within its environment as the VOD content is streamed from an environment of the instructions to the environment of the requester.

In an embodiment, at 333, the instructions may consult a VOD server or service (such as the services represented by the methods 100 and 200 of the FIGS. 1 and 2) before the instructions provide the VOD content to the requestor. For example, the instructions may send a request for access to the VOD server with an identity of the requestor or an access key presented by the requestor; in return the VOD server either sends an authorization or a denial. If authorization is provided, then the instructions proceed with the P2P connection and deliver the VOD content to the requester. If authorization is denied, then the instructions may log the event and terminate the P2P connection with the requester, or even redirect the requestor to the VOD server to properly purchase the desired VOD content.

At 340, the instructions send a notification to the VOD content server once the VOD content is successfully delivered to the requestor over the P2P connection. This permits the VOD content server to log the fact or event that the requestor has successfully received the VOD content. In some cases, if a billing event had not yet been recorded by the VOD content server, then this notification from the instructions generates the processing to produce a billing event for the requestor and an account of the requestor.

According to an embodiment, at 341, the instructions may identify a variety of information within the notification that is provided to the VOD content service, such as a date and time that the VOD content was delivered to the requester over the P2P connection, the identity of the requestor, an identifier for the VOD content delivered, statistics indicating the elapsed time and bandwidth associated with completing the transaction with the requester, and the like.

In an embodiment, at 350, the instructions may also remove the VOD content in response to instructions received from the VOD content server. So, the length of time that the instructions permit the VOD content to remain within its environment may be determined on demand by instructions from the VOD content service. Alternatively, the VOD content server may provide metadata or a policy with the VOD content that the instructions enforce and evaluate to determine when it is appropriate to remove the VOD content. The policy may also define certain access restrictions that the instructions can enforce on its own.

Figure 4:
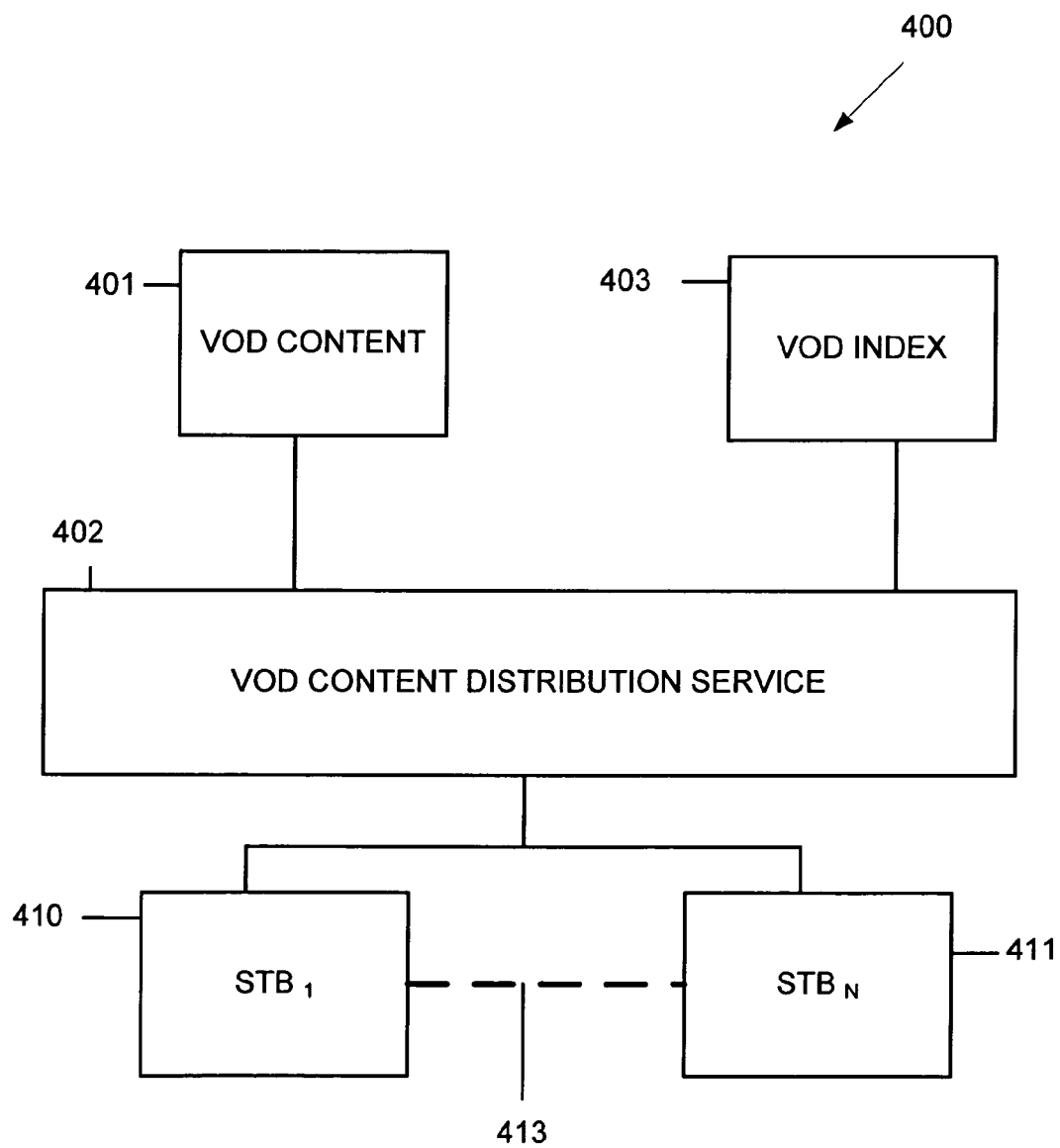
FIG. 4 is diagram of a VOD distribution system, according to an example embodiment of the disclosure.

FIG. 4 is diagram of a VOD distribution system 400, according to an example embodiment of the disclosure. The VOD distribution system 400 is implemented within a machine-accessible medium. The VOD distribution system 400 implements, among other things, the methods 100 and 200 of the FIGS. 1 and 2 and facilitates or interacts with the method 300 of the FIG. 3.

The VOD distribution system 400 includes VOD content 401 and a VOD content distribution service 402. The VOD distribution system 400 may also include a VOD index 403. The VOD content 401 resides in memory and within a repository that may include a variety of other VOD content 401. The memory may be volatile or non volatile and it may also be fixed or removable storage. Furthermore, the VOD content distribution service 402 may be referred to as a VOD content distribution service element, such as a server, proxy, gateway, etc. Each of the components of the VOD distribution system 400 and the relationships of the components to STB's 410 and 411 will now be discussed in detail.

The VOD content 401 may include material related to televisions shows, documentaries, movies, sporting events, news events, and others. The VOD content 401 is housed within storage devices or on removable media and subsequently interfaced to a device that makes it available on the network. Viewers request the VOD content 401 from their local environments using their STB's 410 and 411 to contact the VOD content distribution service 402.

The VOD content distribution service 402 initially distributes or injects the VOD content 401 into the network by placing it or delivering it to one or more first or initial STB's 410. Example processing associated with the VOD content distribution service 402 was provided above with the discussion of the methods 100 and 200 of the FIGS. 1 and 2.

The VOD content distribution service 402 may pre-seed or pre-populate the first or initial STB's 410 with the VOD content 401. Alternatively, the VOD content distribution service 402 may inject the VOD content 401 after viewers associated with the first or initial STB's 410 make a specific request for the VOD content 401.

The VOD content distribution service 402 also manages identities associated with the STB's 410 and 411 and the viewers associated with those STB's 410 and 411. The VOD content distribution service 402 also keeps track of which STB's 410 or 411 have which VOD content 401 at any particular point in time.

According to an embodiment, the association and information associated with the STB's 410 and 411 and the VOD content 401 is maintained in a VOD index.403. The VOD content distribution service 402 generates and manages the VOD index 403. The VOD index 403 is regularly updated with new associations, modified associations, and/or deleted associations. The associations may also include geographical profile information for the STB's 410 and 411, which identify a present or current geographical location for each of the STB's 410 and 411.

The VOD content distribution service 402 also processes requests from viewers (requesters) for specific VOD content 401 after that specific VOD content 401 has been injected into the network and is present on a number of the STB's 410.

When a request for VOD content 401 is received, the VOD content distribution service 402 determines one or more specific viewers or STB's 410 that can service the request by delivering the VOD content 401 to the requesting viewers or STB's 411 with a P2P connection. Essentially, the VOD content distribution service 402 is a manager of where and how requestors may best or optimally acquire desired VOD content 401. One technique for doing this is to perform a geographic proximity search on the STB's 410 that have the desired VOD content 401 when a requesting STB 411 at a given or known geographical location dynamically or in real time requests the VOD content 401 from the VOD content distribution service 402.

The VOD content 401 is then delivered to a requesting STB 411 from a source STB 410 via a P2P connection 413.

According to an embodiment, the VOD content distribution service 402 may also initially populate or seed the first or initial STB's 410 with the VOD content 401 in an encrypted format. The encrypted format is decrypted and playable with a license or access key. The key may be delivered to the requestors or requesting STB's 411 from the VOD content distribution service 402 when the specific VOD content 401 is requested. Thus, some first or initial STB's 410 may not even have the key to play the VOD content 401 and may function solely as a distribution point for the VOD content distribution service 402.

In an embodiment, the VOD content distribution service 402 may also provide policies to be dynamically enforced by the STB's 410 that have and distribute the VOD content 401 or may globally enforce policies and communicate instructions to each of the STB's 410. For example, the VOD content distribution service 402 may evaluate a policy and determine that the VOD content 401 is to be removed from one, all, or some subset of the STB's 410 and 411 and issue instructions to those STB's 410 and 411 to remove the VOD content 401. Policies about reporting may also be used between the STB's 410 and 411 and the VOD content distribution service 402.

It is also noted that once a requesting STB 411 receives specific desired VOD content 401, that receiving STB 411 may now become a P2P distribution point over the network for other STB's 410 or 411 that may subsequently request the same VOD content 401.

Figure 5:
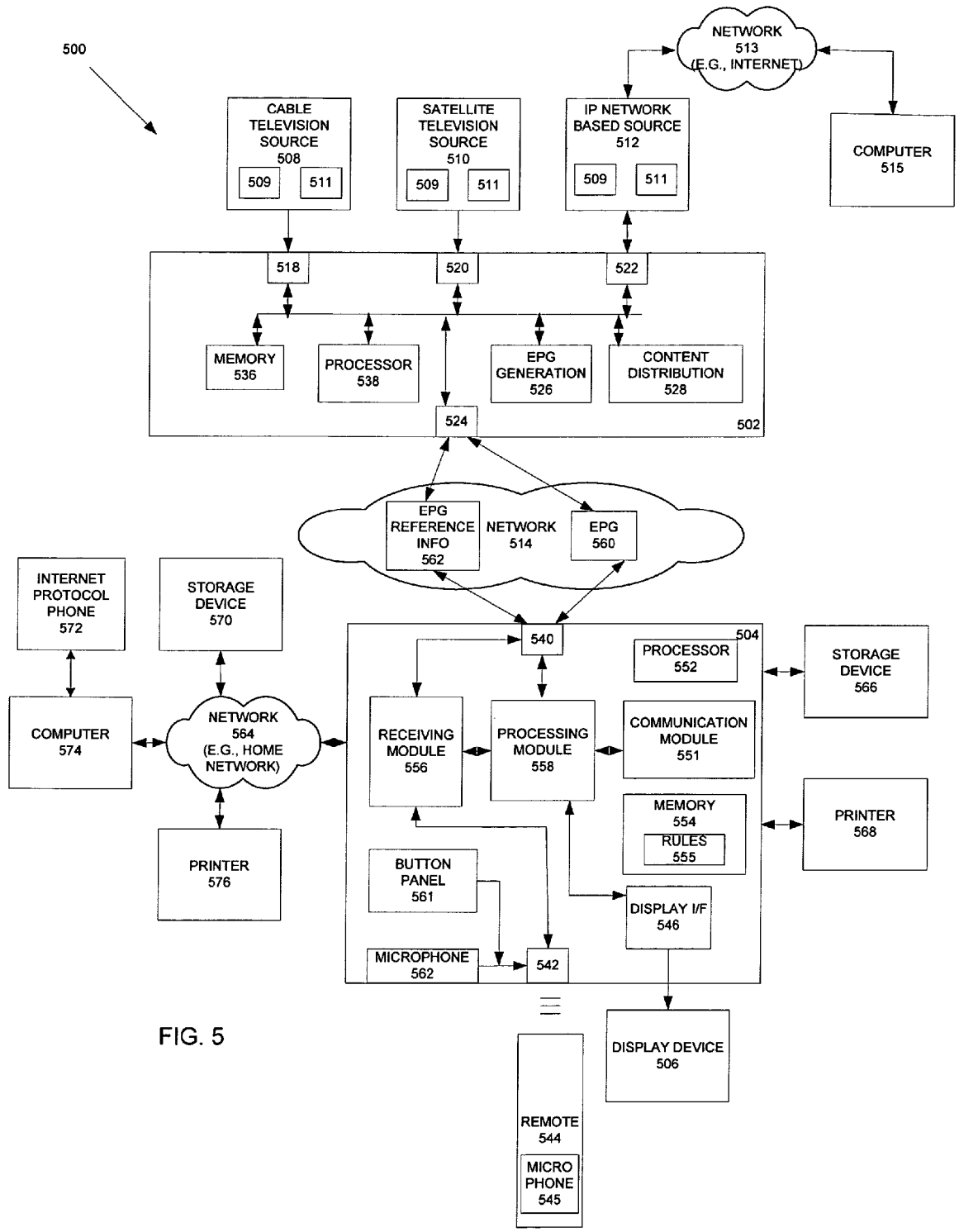
FIG. 5 is a diagram of an example network architecture for devices, machines, services, systems, and instructions to interact and perform any one or more of the methodologies discussed herein, according to an example embodiment of the disclosure.
Figure 6:
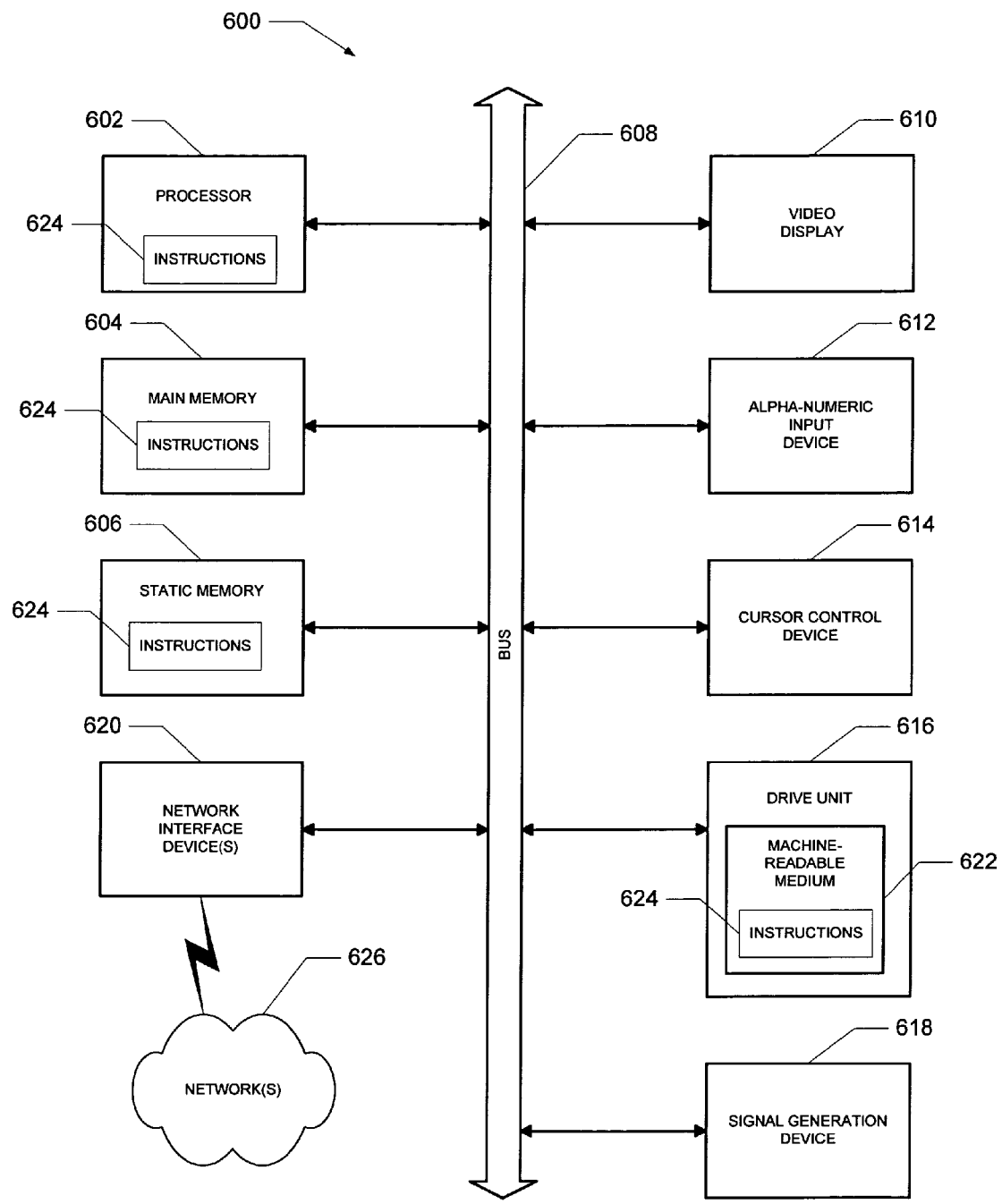
FIG. 6 is a diagram of an example machine architecture within which a set of instructions for causing the machine to perform any one or more of the methodologies discussed herein may be executed, according to an example embodiment of the disclosure.

FIGS. 5-6 are now presented for purposes of providing an example network architecture and machine architecture for which devices can interact to achieve the teachings and techniques presented herein. This layout and configuration is presented for purposes of illustration only and is not intended to limit the embodiments presented herein.

FIG. 5 is a diagram of an example network architecture 500 for devices, machines, services, systems, and instructions to interact and perform any one or more of the methodologies discussed herein, according to an example embodiment of the disclosure.

FIG. 5 may also be viewed as an example multimedia distribution system 500 that is implemented in accordance with at least one embodiment of the present disclosure. As shown, the system 500 includes a multimedia content provider 502, a set-top box 504, a display device 506, a plurality of multimedia content sources, such as cable television source 508, satellite television source 510, and IP network-based source 512.

In the illustrated embodiment, the content provider 502 and the set-top box 504 are connected via a network 514, where the network 514 can include a cable television distribution network, a satellite distribution network, a broadcast television distribution network, a data packet-based computer network (e.g., an Ethernet network), and the like. Likewise, the content sources 508, 510, and 512 may be connected via one or more networks to the content provider 502.

As shown, the content provider 502 can include one or more interfaces 518, 520, and 522 to interface with the content sources 508, 510, and 512, respectively, and an interface 524 to interface with the set-top box 504 via the network 514. The interfaces 518, 520, 522, and 524 may include any of a variety of interfaces, such as a coaxial cable interface, a wireless interface for receiving satellite or broadcast transmissions, or a data packet network interface, such as an Ethernet interface or a router. The IP Network based source 512 is shown to be connected to a computer 515 over a network 513 (e.g., Internet) thereby providing a communication path between a user operating the set-top box 504 and a user operating the computer 515. The content provider 502 further may include an EPG generation module 526 and a multimedia content distribution module 528. The modules 526 and 528 may be implemented as software, hardware, firmware, or combinations thereof. To illustrate, the content provider 502 may include a memory 536 (e.g., static random access memory (SRAM)) and one or more processors 538, where the modules 526 and 528 may be implemented in part or in whole as executable instructions stored in the memory 536 and executed by the processor 538 to perform the techniques described herein.

As also shown, the set-top box 504 may include an interface 540 for interfacing with the content provider 502 via the network 514, a control interface 542 to receive user input and commands, (e.g., via a remote control 544, a button panel 561, a microphone 562) and a display interface 546 to interface with the display device 506. The interface 540 may include any of a variety of appropriate interfaces, such as a coaxial cable interface, a wireless interface to send and receive wireless transmissions, or a data packet-based network interface, such as an Ethernet interface. The control interface 542 may include any of a variety of interfaces, such as an infrared interface, a wireless interface, or the button panel 561. The remote control 544 is shown to include a microphone 545 for receiving voice commands and the set-top box 504 is also shown to include a microphone 562 for receiving voice commands.

The set-top box 504 is further shown to be connected to a storage device 566 (e.g., hard disk, compact disk, floppy, universal serial bus key, etc.) for storing files, a printer 568 for printing files, and a network 564 (e.g., home network). The network 564, in one embodiment, may connect the set-top box 504 to a computer 574 that is connected to an internet protocol phone 572, a storage device 570 for storing electronic files, and a printer 576. The set-top box 504 further may include a processing module 558, a receiving module 556, and a communication module 551. The processing module 558, receiving module 556, and communication module 551 may be implemented as hardware, software, firmware, or combinations thereof. To illustrate, the set-top box 504 may include a memory 554 and one or more processors 552, where one or both of modules 548 and 550 are implemented as executable instructions stored in memory 554 and executed by the processor 552 to implement techniques described herein. The memory is further shown to include rules 555 that may be utilized to control the use of images that may be captured from content that is displayed on the display device 506. For example the rules 555 may embodied as a digital rights management license that may be distributed with content from the content source 508, 510, and 512. As is well known in the art, the license may include rules 555 that may restrict the use of the associated content.

In a particular embodiment, the content provider 502 receives data representative of multimedia channels from each of the different content sources 508, 510, and 512, and provides data representative of at least a subset of the multimedia channels to the set-top box 504 for processing and display at the display device 506 and/or output via an audio device (not shown). In one embodiment, the content provider may include a content module 509 that communicates data that includes content and a control module 511 that may communicate data that includes control information (e.g., digital license) that may include a rule that restricts the use of associated content. Moreover, in a particular embodiment, the content provider 502 may provide data representative of an electronic programming guide (EPG) 560 to the set-top box 504 for processing by the processing module 558 and for navigation by a user via the control interface 542 and the processing module 558. As described herein, the EPG 560, in one embodiment, represents a unified EPG including listings for the multimedia channels provided by two or more content sources that provide multimedia channels to the content provider 502. To illustrate, in a particular embodiment, the EPG 560 represents a navigable program guide or user interface whereby a user, via the remote control 544 or other input device, can direct the processing module 550 to navigate between multimedia channels by selecting an icon or other graphical representation of the desired channel as represented by a graphical display of the EPG 560. The EPG 560 may combine representations of all of the multimedia channels from different content sources in a single list or different lists for different content sources may be displayed concurrently by the EPG 560. Moreover, multimedia channels may be organized within the EPG 560 based on any of a variety of characteristics, such as by the program content of the multimedia channels, where the program content describes the genre or categorization of the video/audio program represented by the multimedia channel. Examples of various genres or categories include a "comedy" genre, an "action" genre, a "family" genre or "children" genre, a "romance" genre, a "science-fiction" genre, and the like.

FIG. 6 is a diagram of an example machine architecture within which a set of instructions for causing the machine to perform any one or more of the methodologies discussed herein may be executed, according to an example embodiment of the disclosure.

Accordingly, FIG. 6 shows a diagrammatic representation of machine in the example form of a computer system 600 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R §1.72 (b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

What is claimed is:

1. A method comprising:
distributing, by a processing system including a processor, a first item of video on demand content to equipment of a viewer of a plurality of viewers for storage on the equipment of the viewer without providing a viewer notification, wherein the distributing of the first item of video on demand content is not based on a requestor device requesting the video on demand content;
generating, by the processing system, an index of equipment of the plurality of viewers comprising indicia of geographical locations of the equipment of the plurality of viewers and indicia of a plurality of video on demand content items stored thereon;
receiving, by the processing system, a request for the first item of video on demand content from the requestor device, wherein the first item of video on demand content comprises personalized video content;
identifying, by the processing system, a geographical location of the requestor device;
searching, by the processing system, the index of the equipment of the plurality of viewers to identify the equipment of the viewer storing the first item of video on demand content and determining when the equipment of the viewer storing the first item of video on demand content is within a proximity to the geographical location of the requestor device, by comparing distances between the geographical location of the requestor device and geographical locations of the equipment of the viewer storing the first item of video on demand content against a predetermined distance threshold;
providing, by the processing system, an access key to the requestor device, wherein access by the requestor device to a first portion of the first item of video on demand content stored by the equipment of the viewer is based on a presentation of the access key by the requestor device;

instructing, by the processing system, the requestor device to obtain the first portion of the first item of video on demand content from the equipment of the viewer storing the first item of video on demand content in response to determining when the equipment of the viewer storing the first item of video on demand content is within the proximity to the geographical location of the requestor device and responsive to the presentation of the access key by the requestor device;

instructing, by the processing system, the requestor device to obtain a second portion of the first item of video on demand content from the processing system; and instructing, by the processing system, the equipment of the viewer to remove the first item of video on demand content from storage in response to policy evaluation.

2. The method of claim 1, comprising facilitating, by the processing system, a peer-to-peer connection between the requestor device and the equipment of the viewer storing the first item of video on demand content to deliver the first portion of the first item of video on demand content to the requestor device.

3. The method of claim 1, wherein the identifying of the geographical location of the requestor device is based on a billing address of the requestor device, the method further comprising recording, by the processing system, a billing event for the requestor device responsive to the equipment of the viewer storing the first item of video on demand content reporting that the first item of video on demand content was delivered to the requestor device, wherein the access key is selected from a group consisting of a license key, an encryption key and an IP address.

4. The method of claim 1 comprising encrypting, by the processing system, the first item of video on demand content, wherein access to play the first item of video on demand content is enabled by way of a license key distributed by the processing system to the requestor device.

5. The method of claim 1, wherein the access key facilitates access to a service of the equipment of the viewer storing the first item of video on demand content, and wherein the distributing of the first item of video on demand content comprises pre-selecting, by the processing system, the equipment of the viewer of the plurality of viewers responsive to the first item of video on demand content becoming available, wherein the pre-selecting occurs before the first item of video on demand content is available.

6. The method of claim 5, wherein the equipment of the viewer storing the first item of video on demand content comprises the requestor device, wherein presence of the video on demand content at the equipment of the viewer storing the first item of video on demand content is unbeknownst to the equipment of the viewer storing the first item of video on demand content.

7. The method of claim 6, comprising selecting, by the processing system, the equipment of the plurality of viewers in response to the geographical location of the requestor device and geographic profile information.

8. The method of claim 1, wherein the access key permits the requestor device to directly connect to peer-to-peer communication services of the equipment of the viewer storing the first item of video on demand content.

9. A machine-readable memory having instructions embedded thereon, the instructions when accessed by a processing system including a processor facilitate performance of operations comprising:

receiving a first item of video on demand content without notification, wherein the receiving of the first item of video on demand content is not based on a request from the processing system;

receiving a request for the first item of video on demand content from a requestor device, wherein the first item of video on demand content comprises personalized video content and the processing system is selected from a prioritized list of viewer devices to service the request for the first item of video on demand content, wherein the prioritized list of viewer devices is generated by searching a network to identify a plurality of viewers having respective devices storing a plurality of items of video on demand content, including the first item of video on demand content, and being within a proximity to a geographical location of the requestor device determined by comparing distances between the geographical location of the requestor device determined from a billing address and geographical locations of devices of the plurality of viewers against a predetermined distance threshold;

receiving an access key from the requestor device;

establishing a peer-to-peer connection with the requestor device responsive to the receiving of the access key, wherein delivery of the first item of video on demand content is based on the receiving of the access key from the requestor device;

delivering the first item of video on demand content to the requestor device over the peer-to-peer connection, wherein a second portion of the first item of video on demand content is delivered to the requestor device from a video distribution service; and removing the first item of video on demand content from storage in response to a policy received from the video distribution service.

10. The machine-readable memory of claim 9, wherein delivering further comprises streaming the first item of video on demand content to the requestor device during the peer-to-peer connection.

11. The machine-readable memory of claim 9, wherein the operations further comprise requesting confirmation from the video on demand content server before delivering the first item of video on demand content to the requestor device over the peer-to-peer connection and wherein a location of the requestor device is a geographical location determined in response to the billing address for the requestor device for video on demand service.

12. The machine-readable memory of claim 9, wherein the operations further comprising pre-selecting a viewer device to store the first item of video on demand content before the first item of video on demand content is available, to store the first item of video on demand content when the first item of video on demand content becomes available.

13. The machine-readable memory of claim 9, wherein the operations further comprising encrypting the first item of video on demand content, wherein access to play the first item of video on demand content is enabled by way of a license key distributed to the requestor device.

14. The machine-readable memory of claim 9, wherein the operations further comprising retaining geographic profile information for each viewer of the plurality of viewers, wherein a location of the requestor device is a geographical location determined in response to the billing address for the requestor device for video on demand service.

15. A system, comprising:
a memory that stores executable instructions and having a repository to store video on demand content; and
a video on demand distribution service element comprising a processing system including a processor in communication with the memory, wherein the video on demand distribution service element, responsive to executing the instructions, facilitates performance of operations comprising:
distributing a first item of video on demand content to a set top box of a viewer without providing a notification, wherein the distributing of the first item of video on demand content is not based on a requesting subscriber device requesting the first item of video on demand content;
identifying a plurality of viewers having a plurality of set-top boxes storing a plurality of items of video on demand content;
generating an index of a plurality of set top boxes comprising indicia of geographical locations of the plurality of set top boxes and indicia of the plurality of video on demand content items stored thereon, wherein the plurality of set top boxes comprises the set top box of the viewer;
managing identities of the plurality of set-top boxes to service a request from the requesting subscriber device for the first item of video on demand content comprising personalized video content;
providing an access key to the requesting subscriber device, wherein acquisition of a first portion of the first item of video on demand content is based on a presentation of the access key by the requesting subscriber device;
selectively distributing an identity of a set top box of the plurality of set top boxes in response to the request, wherein the identities of a group of set top boxes of the plurality of set top boxes storing the first item of video on demand content and being within a proximity to a geographical location of the requesting subscriber device are determined by comparing distances between the geographical location of the requesting subscriber device and geographical locations of the set-top boxes of the plurality of set top boxes storing the first item of video on demand content against a predetermined distance threshold, and wherein the requesting subscriber device subsequently acquires the first portion of the first item of video on demand content via peer-to-peer exchange with a source set-top box of the plurality of set top boxes in the index, storing the first item of video on demand content and within the proximity to the geographical location of the requesting subscriber device and wherein the requesting subscriber device subsequently acquires a second portion of the first item of video on demand content from the video on demand distribution service element;
distributing the second portion of the first item of video on demand content to the requesting subscriber device, responsive to the presentation of the access key by the requesting subscriber device, wherein the first portion of the first item of video on demand content is distributed to the requesting subscriber device from the source set-top box; and
distributing a policy to the set top box of the viewer to instruct removing the first item of video on demand content from storage.

16. The system of claim 15, wherein the operations further comprise maintaining a video on demand index comprising geographic profile information for each of the plurality of viewers and for the requesting subscriber device that subsequently request the first item of video on demand content, and identifying the first item of video on demand content and pre-seeds the set-top-boxes of the plurality of viewers, and wherein the key is one of a license key, an encryption key or an IP address.

17. The system of claim 15, wherein the operations further comprise enforcing a retention policy for the first item of video on demand content with each of the set-top-boxes of the plurality of viewers based on a policy supplied with the video on demand content and, in response to the retention policy, instructing the set-top boxes of the plurality of viewers to remove the first item of video on demand content.

18. The system of claim 15, wherein the operations further comprise distributing the first item of video on demand content in an encrypted format, and wherein the encrypted format is decrypted with a license key to enable playback of the first item of video on demand content.

19. The system of claim 18, wherein a location of the requesting subscriber device is determined according to a billing address of the requesting subscriber device.

20. The system of claim 18, wherein the operations further comprise distributing the license key to the requesting subscriber device in response to the request for the first item of video on demand content.

* * * * *